United States Patent
Iwata

(10) Patent No.: US 11,611,131 B2
(45) Date of Patent: *Mar. 21, 2023

(54) POROUS LAYER HAVING NONUNIFORM INTERNAL STRUCTURE, BATTERY LAMINATED SEPARATOR AND NONAQUEOUS ELECTROLYTE SECONDARY BATTERY INCLUDING THE SAME

(71) Applicant: Sumitomo Chemical Company, Limited, Tokyo (JP)

(72) Inventor: Shizuka Iwata, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 208 days.

This patent is subject to a terminal disclaimer.

(21) Appl. No.: 16/849,042

(22) Filed: Apr. 15, 2020

(65) Prior Publication Data
US 2020/0335752 A1 Oct. 22, 2020

(30) Foreign Application Priority Data

Apr. 16, 2019 (JP) .............................. JP2019-078113

(51) Int. Cl.
H01M 50/446 (2021.01)
H01M 4/62 (2006.01)

(52) U.S. Cl.
CPC ........... H01M 50/446 (2021.01); H01M 4/62 (2013.01)

(58) Field of Classification Search
CPC .................................................. H01M 50/446
USPC ........................................ 429/144, 251, 254
See application file for complete search history.

(56) References Cited

U.S. PATENT DOCUMENTS

| 2004/0261192 | A1* | 12/2004 | Cardamone | D06M 13/207 8/115.51 |
| 2011/0269010 | A1* | 11/2011 | Sawaguchi | H01M 50/423 977/773 |
| 2017/0155110 | A1 | 6/2017 | Yashiki | |
| 2017/0155119 | A1* | 6/2017 | Suzuki | H01M 50/431 |
| 2017/0365836 | A1* | 12/2017 | Ogata | H01M 50/451 |
| 2019/0245176 | A1 | 8/2019 | Suzuki et al. | |
| 2019/0319241 | A1 | 10/2019 | Yashiki | |
| 2020/0006734 | A1 | 1/2020 | Murakami et al. | |
| 2020/0335750 | A1* | 10/2020 | Iwata | H01M 50/489 |

FOREIGN PATENT DOCUMENTS

| CN | 1107039621 A | 8/2017 |
| JP | 2004303473 A | 10/2004 |
| JP | 2010221455 A | * 10/2010 |
| WO | 20180787077 A1 | 5/2018 |

OTHER PUBLICATIONS

Office Action dated Oct. 7, 2022 in U.S. Appl. No. 16/848,883 of Iwata.

* cited by examiner

*Primary Examiner* — Sean P Cullen

(74) *Attorney, Agent, or Firm* — Panitch Schwarze Belisario & Nadel LLP

(57) ABSTRACT

The present invention provides a nonaqueous electrolyte secondary battery porous layer which improves a long-term battery characteristic of a nonaqueous electrolyte secondary battery. In the nonaqueous electrolyte secondary battery porous layer in accordance with an aspect of the present invention, a standard deviation of whiteness index defined in E313 of the American Standards Test Methods is 0.06 or more and 0.91 or less.

11 Claims, No Drawings

POROUS LAYER HAVING NONUNIFORM INTERNAL STRUCTURE, BATTERY LAMINATED SEPARATOR AND NONAQUEOUS ELECTROLYTE SECONDARY BATTERY INCLUDING THE SAME

This Nonprovisional application claims priority under 35 U.S.C. § 119 on Patent Application No. 2019-078113 filed in Japan on Apr. 16, 2019, the entire contents of which are hereby incorporated by reference.

TECHNICAL FIELD

The present invention relates to a porous layer for a nonaqueous electrolyte secondary battery (hereinafter referred to as "nonaqueous electrolyte secondary battery porous layer").

BACKGROUND ART

Nonaqueous electrolyte secondary batteries, particularly lithium ion secondary batteries, have a high energy density and are therefore in wide use as batteries for personal computers, mobile phones, portable information terminals, and the like. Such nonaqueous electrolyte secondary batteries have recently been developed as on-vehicle batteries.

As a member of such a nonaqueous electrolyte secondary battery, a separator having excellent heat resistance is under development. As the separator which excels in heat resistance, a separator including a porous layer which contains a heat-resistant component is known.

As an example of the separator including a porous layer, Patent Literature 1 discloses a polyelectrolyte porous film in which a maximum frequency of whiteness of a surface is 70% or higher and a standard deviation of whiteness is controlled to a very small value, i.e., 0.0025 or less.

CITATION LIST

Patent Literature

[Patent Literature 1]
Japanese Patent Application Publication Tokukai No. 2004-303473

SUMMARY OF INVENTION

Technical Problem

However, the separator including the porous layer as disclosed in Patent Literature 1, i.e., a conventional separator including a porous layer which contains a heat-resistant component is still insufficient in long-term battery characteristic.

Solution to Problem

The present invention has aspects described in [1] through [10] below.
[1] A nonaqueous electrolyte secondary battery porous layer, in which a standard deviation of whiteness index is 0.06 or more and 0.91 or less, the whiteness index being defined in E313 of the American Standards Test Methods.
[2] The nonaqueous electrolyte secondary battery porous layer described in [1], containing one or more resins selected from the group consisting of polyolefin, a (meth)acrylate resin, a fluorine-containing resin, a polyamide resin, a polyester resin, and a water-soluble polymer.
[3] The nonaqueous electrolyte secondary battery porous layer described in [1], containing a polyamide resin.
[4] The nonaqueous electrolyte secondary battery porous layer described in [3], in which the polyamide resin is an aramid resin.
[5] The nonaqueous electrolyte secondary battery porous layer described in [4], in which the aramid resin is one or more aramid resins selected from the group consisting of poly(paraphenylene terephthalamide), poly(metaphenylene terephthalamide), and a paraphenylene terephthalamide/metaphenylene terephthalamide copolymer.
[6] The nonaqueous electrolyte secondary battery porous layer described in any one of [1] through [5], containing a heat-resistant filler.
[7] The nonaqueous electrolyte secondary battery porous layer described in [6], in which the heat-resistant filler contains an inorganic filler.
[8] The nonaqueous electrolyte secondary battery porous layer described in [7], in which the inorganic filler contains one or more inorganic substances selected from the group consisting of alumina, boehmite, aluminum hydroxide, magnesium hydroxide, magnesium oxide, titanium oxide, and silica.
[9] A nonaqueous electrolyte secondary battery laminated separator, in which a nonaqueous electrolyte secondary battery porous layer described in any one of [1] through [8] is stacked on one surface or both surfaces of a polyolefin porous film.
[10] A nonaqueous electrolyte secondary battery including: a nonaqueous electrolyte secondary battery porous layer described in any one of [1] through [8]; or a nonaqueous electrolyte secondary battery laminated separator described in [9].

Advantageous Effects of Invention

The nonaqueous electrolyte secondary battery porous layer in accordance with an embodiment of the present invention advantageously makes it possible to provide a nonaqueous electrolyte secondary battery having an excellent long-term battery characteristic such as a resistance increase ratio through 100 cycles.

DESCRIPTION OF EMBODIMENTS

The following description will discuss embodiments of the present invention. Note, however, that the present invention is not limited to the embodiments. The present invention is not limited to arrangements described below, but may be altered in various ways by a skilled person within the scope of the claims. The present invention also encompasses, in its technical scope, any embodiment derived by combining technical means disclosed in differing embodiments. Note that a numerical range "A to B" herein means "A or more (higher) and B or less (lower)" unless otherwise stated.

Embodiment 1: Nonaqueous Electrolyte Secondary Battery Porous Layer

In a nonaqueous electrolyte secondary battery porous layer (hereinafter simply referred to as "porous layer") in accordance with an embodiment of the present invention, a standard deviation of whiteness index is 0.06 or more and 0.91 or less, the whiteness index being defined in E313 of the American Standards Test Methods.

The nonaqueous electrolyte secondary battery porous layer in accordance with an embodiment of the present invention can solely constitute a separator for a nonaqueous electrolyte secondary battery (hereinafter referred to as a "nonaqueous electrolyte secondary battery separator"). Alternatively, the nonaqueous electrolyte secondary battery porous layer in accordance with an embodiment of the present invention can be stacked on at least one surface of a polyolefin porous film so as to constitute a laminated separator for a nonaqueous electrolyte secondary battery (hereinafter referred to as a "nonaqueous electrolyte secondary battery laminated separator") which will be described later.

The whiteness index (whiteness, WI) is a parameter indicative of a ratio of intensity of reflected light with respect to intensity of incoming light measured when light is caused to enter a porous layer through one surface of the porous layer. That is, the whiteness index is a parameter indicative of a recovery rate of the reflected light.

In a case where the porous layer in accordance with an embodiment of the present invention solely constitutes a nonaqueous electrolyte secondary battery separator, light can be emitted toward any surface of the porous layer in measuring WI. Meanwhile, in a case where the porous layer in accordance with an embodiment of the present invention is stacked on at least one surface of a polyolefin porous film (described later) so as to constitute a nonaqueous electrolyte secondary battery laminated separator (described later), a surface of the porous layer irradiated with light in measuring WI is a surface which is opposite to a surface facing the polyolefin porous film.

An amount (intensity) of the reflected light is an amount obtained by subtracting, from an amount (intensity) of incoming light, an amount of light (absorbed light) absorbed by the nonaqueous electrolyte secondary battery porous layer and an amount of light (scattered light) scattered inside the nonaqueous electrolyte secondary battery porous layer.

The amount of the absorbed light correlates with (i) absorbance of a material itself which constitutes the nonaqueous electrolyte secondary battery porous layer and (ii) an area of a colored component which is irradiated with the incoming light in the porous layer. The area of the colored component which is irradiated with the incoming light correlates with a weight per unit area of the nonaqueous electrolyte secondary battery porous layer. For example, as the weight per unit area becomes larger, the amount of absorbed light increases. The amount of scattered light correlates with an internal structure of the nonaqueous electrolyte secondary battery porous layer.

In the same nonaqueous electrolyte secondary battery porous layer, absorbance of a material itself constituting the nonaqueous electrolyte secondary battery separator does not vary depending on measured portions. Therefore, the standard deviation of whiteness index correlates with a degree to which the weight per unit area and the internal structure of the nonaqueous electrolyte secondary battery porous layer vary depending on measured portions. From this, according to an embodiment of the present invention, the standard deviation of whiteness index is a parameter which indicates uniformity of the internal structure of the nonaqueous electrolyte secondary battery porous layer.

Conventionally, as a nonaqueous electrolyte secondary battery porous layer, a polyelectrolyte porous film (for example, Patent Literature 1) in which a standard deviation of whiteness index is very small and an internal structure is uniform was considered as being excellent. However, this time, it has been found that a porous layer in which a standard deviation of whiteness index falls within a specific range and a nonaqueous electrolyte secondary battery laminated separator including such a porous layer can further improve a long-term battery characteristic of a nonaqueous electrolyte secondary battery.

Here, in a case where charge-discharge cycles are repeated, a deposit such as foreign metal can be generated due to a side reaction between a nonaqueous electrolyte and a positive electrode material, decomposition of the nonaqueous electrolyte, and/or the like. In a case where the standard deviation of whiteness index is very small, i.e., less than 0.06 and the charge-discharge cycles have been repeated, the deposit can intrude into the porous layer. As a result, uniformity of internal structures of the porous layer and of the nonaqueous electrolyte secondary battery laminated separator including the porous layer is decreased, and a long-term battery characteristic of a nonaqueous electrolyte secondary battery which includes the porous layer or the nonaqueous electrolyte secondary battery laminated separator including the porous layer may be deteriorated.

In contrast, according to the porous layer in accordance with an embodiment of the present invention, the standard deviation of whiteness index is 0.06 or more, and nonuniformity (unevenness) which cannot be visually confirmed exists in the internal structure of the porous layer. According to the porous layer in accordance with an embodiment of the present invention and the nonaqueous electrolyte secondary battery laminated separator including the porous layer, the nonuniformity reduces a degree of decrease in uniformity of the internal structure caused due to the deposit, and consequently a degree of decrease in uniformity of voids is reduced. As a result, it is possible to improve the long-term battery characteristic.

From the viewpoint of improving the long-term battery characteristic, the standard deviation of whiteness index is preferably 0.10 or more, more preferably 0.15 or more, further preferably 0.20 or more.

In a case where the standard deviation of whiteness index is excessively large, nonuniformity of the internal structure of the porous layer becomes too large, and there are possibilities that unevenness occurs in ion permeability and that very small short circuit occurs inside the porous layer or inside the nonaqueous electrolyte secondary battery laminated separator including the porous layer. This may lead to a deterioration of a long-term battery characteristic of the nonaqueous electrolyte secondary battery including (i) the porous layer or (ii) the nonaqueous electrolyte secondary battery laminated separator including the porous layer.

Therefore, the standard deviation of whiteness index is 0.91 or less, preferably 0.80 or less, more preferably 0.60 or less, further preferably 0.50 or less.

The standard deviation of whiteness index can be 0.10 or more and 0.80 or less, can be 0.15 or more and 0.60 or less, and can be 0.20 or more and 0.50 or less.

A method for measuring the whiteness index can be, for example, the following method. That is, black paper is placed as an underlay on an experiment base, and a measurement target object is placed on the black paper. Then, the measurement target object is irradiated with light from above. Then, under conditions of "(Conditions for measuring WI)" described later in Examples, the whiteness index is measured with use of a commercially available spectrophotometric colorimeter.

According to an embodiment of the present invention, a standard deviation of whiteness index is obtained as follows: that is, in the above measuring method, the whiteness index is measured two or more times with respect to the same measurement target object while arbitrarily changing portions to be irradiated with light; then, from the plurality of measured values of the whiteness index, a standard deviation is calculated. In that case, the standard deviation of whiteness index is calculated by measuring the whiteness index while changing portions to be irradiated with light at least three times or more, preferably five times or more.

Note that the measurement target object can be the porous layer alone or can be the nonaqueous electrolyte secondary battery laminated separator in which the porous layer is stacked on the polyolefin porous film.

In a case where the measurement target object is the nonaqueous electrolyte secondary battery laminated separator, the whiteness index is measured by irradiating, with light, a surface of the porous layer which surface is opposite to a surface facing the polyolefin porous film.

Here, the light which has reached the nonaqueous electrolyte secondary battery laminated separator is reflected, absorbed, and scattered on and in the vicinity of the surface of the porous layer irradiated with the light. From this, even in a case where the measurement target object is the nonaqueous electrolyte secondary battery laminated separator, it is possible to measure, with the above method, whiteness indexes of the porous layer included in the nonaqueous electrolyte secondary battery laminated separator and thus to calculate the standard deviation from the whiteness indexes.

In a case where the nonaqueous electrolyte secondary battery laminated separator has a configuration in which porous layers are stacked on both surfaces of the polyolefin porous film, whiteness indexes of each of the porous layers are separately measured, and thus the standard deviation of whiteness index of each of the porous layers is calculated.

In other words, first, for one of the porous layers stacking on both surfaces of the polyolefin porous film, a surface opposite to a surface facing the polyolefin porous film is irradiated with light, and whiteness indexes are measured for this porous layer with the above described method. Subsequently, for the other of the porous layers stacking on both surfaces of the polyolefin porous film, a surface opposite to a surface facing the polyolefin porous film is irradiated with light, and whiteness indexes are measured and a standard deviation of whiteness index is calculated for this porous layer (i.e., the other porous layer) with the above described method.

The porous layer in accordance with an embodiment of the present invention can be provided, as a member included in a nonaqueous electrolyte secondary battery, between (i) the polyolefin porous film and (ii) at least one of a positive electrode and a negative electrode. The porous layer can be formed on at least one surface of the polyolefin porous film. Alternatively, the porous layer can be formed on an active material layer of at least one of the positive electrode and the negative electrode. Further alternatively, the porous layer can be provided between the polyolefin porous film and at least one of the positive electrode and the negative electrode in such a manner as to be in contact with the polyolefin porous film and with the at least one of the positive electrode and the negative electrode. There can be a single porous layer or two or more porous layers between the polyolefin porous film and at least one of the positive electrode and the negative electrode.

In a case where the porous layer is stacked on one surface of the polyolefin porous film, the porous layer is preferably provided on a surface of the polyolefin porous film which surface faces the positive electrode. The porous layer is more preferably stacked on a surface of the polyolefin porous film which surface is in contact with the positive electrode. The porous layer is preferably an insulating porous layer.

The porous layer in accordance with an embodiment of the present invention has a structure in which many pores, connected to one another, are provided, so that the porous layer is a layer through which a gas or a liquid can pass from one surface to the other. Further, in a case where the porous layer in accordance with an embodiment of the present invention is used as a member included in a nonaqueous electrolyte secondary battery laminated separator, the porous layer can be a layer which serves as an outermost layer of the laminated separator and comes into contact with an electrode.

The porous layer in accordance with an embodiment of the present invention is typically a resin layer containing a resin. It is preferable that the resin is insoluble in the electrolyte of the battery and is electrochemically stable when the battery is in normal use.

Examples of the resin used in the porous layer in accordance with an embodiment of the present invention include polyolefins; (meth)acrylate resins; fluorine-containing resins; polyamide resins; polyimide resins; polyester resins; rubbers; resins having a melting point or glass transition temperature of not lower than 180° C.; water-soluble polymers; polycarbonate, polyacetal, and polyether ether ketone.

Among the above resins, polyolefins, (meth)acrylate resins, fluorine-containing resins, polyamide resins, polyester resins and water-soluble polymers are preferable.

The polyolefins are preferably polyethylene, polypropylene, polybutene, an ethylene/propylene copolymer, and the like.

Examples of the fluorine-containing resins encompass polyvinylidene fluoride, polytetrafluoroethylene, a vinylidene fluoride/hexafluoropropylene copolymer, a tetrafluoroethylene/hexafluoropropylene copolymer, a tetrafluoroethylene/perfluoroalkyl vinyl ether copolymer, a vinylidene fluoride/tetrafluoroethylene copolymer, a vinylidene fluoride/trifluoroethylene copolymer, a vinylidene fluoride/trichloroethylene copolymer, a vinylidene fluoride/vinyl fluoride copolymer, a vinylidene fluoride/hexafluoropropylene/tetrafluoroethylene copolymer, and an ethylene/tetrafluoroethylene copolymer. Particular examples of the fluorine-containing resins encompass fluorine-containing rubber having a glass transition temperature of not higher than 23° C.

As the polyamide resins, aramid resins such as aromatic polyamide and wholly aromatic polyamide are preferable.

Specific examples of the aramid resins include poly(paraphenylene terephthalamide), poly(metaphenylene isophthalamide), poly(metaphenylene terephthalamide), poly(parabenzamide), poly(metabenzamide), poly(4,4'-benzanilide terephthalamide), poly(paraphenylene-4,4'-biphenylene dicarboxylic acid amide), poly(metaphenylene-4,4'-biphenylene dicarboxylic acid amide), poly(paraphenylene-2,6-naphthalene dicarboxylic acid amide), poly(metaphenylene-2,6-naphthalene dicarboxylic acid amide), poly(2-chloroparaphenylene terephthalamide), a paraphenylene terephthalamide/metaphenylene terephthalamide copolymer, a paraphenylene terephthalamide/2,6-dichloroparaphenylene terephthalamide copolymer, and a metaphenylene terephthalamide/2,6-dichloroparaphenylene terephthalamide copolymer. Among these, poly(paraphenylene terephthalamide), poly(metaphenylene terephthalamide), and the paraphenylene terephthalamide/metaphenylene terephthalamide copolymer are preferable.

The polyester resins are preferably aromatic polyesters such as polyarylates, and liquid crystal polyesters.

Examples of the rubbers include a styrene/butadiene copolymer and a hydride thereof, a methacrylate ester copolymer, an acrylonitrile/acrylic ester copolymer, a styrene/acrylic ester copolymer, ethylene propylene rubber, and polyvinyl acetate.

Examples of the resins each having a melting point or a glass transition temperature of not lower than 180° C. include polyphenylene ether, polysulfone, polyether sulfone, polyphenylene sulfide, polyetherimide, polyamide imide, and polyether amide.

Examples of the water-soluble polymers include polyvinyl alcohol, polyethylene glycol, cellulose ether, sodium alginate, polyacrylic acid, polyacrylamide, polymethacrylic acid, and sodium carboxymethylcellulose.

Each of these resins contained in the porous layer can be used solely. Alternatively, two or more of these resins contained in the porous layer can be used in combination.

The porous layer in accordance with an embodiment of the present invention can contain particles. In a case where the porous layer in accordance with an embodiment of the present invention contains particles, the resin is to have a function of a binder resin. The particles are organic particles or inorganic particles which are generally referred to as a filler.

Specific examples of organic substances constituting the organic filler contained in the porous layer in accordance with an embodiment of the present invention include (i) a homopolymer of a monomer such as styrene, vinyl ketone, acrylonitrile, methyl methacrylate, ethyl methacrylate, glycidyl methacrylate, glycidyl acrylate, or methyl acrylate, or (ii) a copolymer of two or more of such monomers; fluorine-containing resins such as polytetrafluoroethylene, an ethylene tetrafluoride/propylene hexafluoride copolymer, a tetrafluoroethylene/ethylene copolymer, and polyvinylidene fluoride; a melamine resin; a urea resin; polyethylene; polypropylene; polyacrylic acid and polymethacrylic acid; a resorcinol resin; and the like. The organic filler can contain a single kind of organic substance or contain two or more kinds of organic substances.

The resorcinol resin can be, specifically, resorcin (resorcinol), and a polymer obtained by polymerizing resorcin and an aldehyde monomer. The aldehyde monomer can be any aldehyde. Examples of the aldehyde monomer include formaldehyde, acetaldehyde, propionaldehyde, benzaldehyde, furfural, thiophene carboxaldehyde, and the like. The aldehyde monomer is preferably formaldehyde. A formaldehyde monomer can be prepared from trioxane (which is a trimer of formaldehyde) or paraformaldehyde (which is a multimer of formaldehyde) in polymerization reaction of resorcin and the formaldehyde monomer. A single kind of aldehyde monomer or a mixture of two or more kinds of aldehyde monomers can be used.

The organic substance can be, other than the above examples, thermoplastic resins having a melting point or a glass transition temperature of not lower than 150° C., e.g., engineering plastics and super engineering plastics. The engineering plastics can be polycarbonate, polyacetal, modified polyphenylene ether, polybutylene terephthalate, and the like. The super engineering plastics can be polyphenyl sulfide, polyallylate, polysulfone, polyether ether ketone, polyetherimide, a liquid crystal polymer, polyimide, and the like.

Specific examples of the inorganic filler contained in the porous layer in accordance with an embodiment of the present invention include fillers each made of an inorganic substance such as calcium carbonate, talc, clay, kaolin, silica, hydrotalcite, diatomaceous earth, magnesium carbonate, barium carbonate, calcium sulfate, magnesium sulfate, barium sulfate, aluminum hydroxide, boehmite, magnesium hydroxide, calcium oxide, magnesium oxide, titanium oxide, titanium nitride, alumina (aluminum oxide), aluminum nitride, mica, zeolite, or glass. Among these, alumina, boehmite, aluminum hydroxide, magnesium hydroxide, magnesium oxide, titanium oxide, and silica are preferable. The inorganic filler can be (i) only one kind of filler or (ii) two or more kinds of fillers in combination.

An average particle diameter (D50) of the filler is preferably 0.001 µm or more and 10 µm or less, more preferably 0.01 µm or more and 8 µm or less, further preferably 0.05 µm or more and 5 µm or less. The average particle diameter of the filler is a value measured with use of MICROTRAC (MODEL: MT-3300EXII) available from NIKKISO CO., LTD.

A shape of the filler varies depending on a method for producing a raw material, i.e., an organic substance or an inorganic substance, a dispersion condition of the filler in preparing a coating liquid for forming the porous layer, and the like. The shape of the filler can be any of various shapes including (i) a shape such as a spherical shape, an oval shape, a rectangular shape, a gourd-like shape and (ii) an indefinite shape having no specific shape.

In a case where the porous layer contains a filler and an amount of the porous layer containing the filler is assumed as 100% by volume, a contained amount of the filler is preferably 40% by volume to 99% by volume, more preferably 45% by volume to 95% by volume. In a case where the contained amount of the filler falls within the above range, it is less likely that a void, which is formed when the fillers come into contact with each other, is blocked by the resin or the like, and this makes it possible to obtain sufficient ion permeability. Furthermore, the contained amount falling within the above range also makes it possible to set a weight per unit area to an appropriate value.

The porous layer can contain two or more kinds of particles in combination which two or more kinds differ from each other in particle diameter or in specific surface area.

The porous layer in accordance with an embodiment of the present invention preferably contains a heat-resistant filler. Here, "heat resistance" means that a melting point is not lower than 150° C. The heat-resistant filler can be one kind of heat-resistant filler or can be a combination of two or more kinds of heat-resistant fillers. The heat-resistant filler is preferably the above described inorganic filler, a heat-resistant organic filler, or a mixture thereof. The heat-resistant filler preferably contains the above described inorganic filler.

The heat-resistant organic filler is preferably a thermosetting resin filler, a heat-resistant thermoplastic resin filler, or a mixture thereof.

A resin constituting the heat-resistant organic filler is preferably the above described aramid resin or the above described resorcinol resin. The aramid resin is preferably poly(paraphenylene terephthalamide), poly(metaphenylene terephthalamide), or the paraphenylene terephthalamide/metaphenylene terephthalamide copolymer.

The porous layer in accordance with an embodiment of the present invention can contain the other component different from the resin and the filler. Examples of that other component include a surfactant, a viscosity modifier, a wax, and the like. A content of that other component is preferably 0% by weight to 10% by weight with respect to the total weight of the porous layer.

A thickness of the porous layer in accordance with an embodiment of the present invention is preferably 5 µm or less per layer, more preferably 4 µm or less per layer, from the viewpoint of preventing a deterioration in battery characteristic. The thickness of the porous layer is preferably 0.5 µm or more per layer, more preferably 1 µm or more per layer, from the viewpoint of sufficiently preventing internal short circuit caused due to breakage of the battery or the like and of preventing a decrease in retained amount of the electrolyte.

In view of ion permeability, the porous layer in accordance with an embodiment of the present invention preferably has a sufficiently porous structure. Specifically, the porous layer preferably has a porosity of 30% to 60%.

The porosity can be calculated by, for example, the following formula (1), where (i) W is a weight (g) of a porous layer having a certain volume (8 cm×8 cm×d (cm) (d: thickness)), (ii) d is the thickness (µm) of the porous layer, and (iii) p is an absolute specific gravity (g/cm$^3$) of the porous layer:

$$\text{Porosity}(\%)=(1-\{(W/\rho/(8\times8\times d)\})\times 100 \quad (1)$$

The porous layer in accordance with an embodiment of the present invention preferably has an average pore diameter which falls within a range from 20 nm to 100 nm, from the viewpoint of ion permeability and of preventing particles from intruding into the positive electrode and the negative electrode.

The average pore diameter can be calculated by, for example, (i) observing the porous layer in accordance with an embodiment of the present invention from an upper surface with use of a scanning electron microscope (SEM), (ii) measuring respective pore diameters of a plurality of holes randomly selected, and (iii) obtaining an average value of the pore diameters thus measured.

A weight per unit area of the porous layer in accordance with an embodiment of the present invention is preferably 0.5 g/m$^2$ to 10 g/m$^2$, more preferably 0.5 g/m$^2$ to 5 g/m$^2$ per layer of the porous layer in view of strength, thickness, weight, and handleability of the porous layer. Moreover, as described above, the weight per unit area of the porous layer correlates with the whiteness index value of the nonaqueous electrolyte secondary battery porous layer in accordance with an embodiment of the present invention. From the viewpoint of controlling the whiteness index value to a suitable range, the weight per unit area of the porous layer in accordance with an embodiment of the present invention is preferably 0.5 g/m$^2$ to 4.6 g/m$^2$, more preferably 1.4 g/m$^2$ to 4.6 g/m$^2$.

[Method for Producing Porous Layer]

A method for producing the porous layer in accordance with an embodiment of the present invention can be, for example, a method which includes a process (1) below and in which a porous layer is formed on a base material. A coating liquid in the process (1) below typically contains the above described resin and, if needed, can contain the above described particles, as components constituting the porous layer in accordance with an embodiment of the present invention. In the coating liquid used in the process (1), the particles can be dispersed and the resin can be dissolved. Examples of the base material encompass a positive electrode, a negative electrode, and a polyolefin porous film which serves as a base material of the nonaqueous electrolyte secondary battery laminated separator in accordance with an embodiment of the present invention. The solvent can be regarded as a solvent in which the resin is dissolved and as a dispersion medium in which the resin or the particles are dispersed.

(1) A process in which (i) a base material is coated with a coating liquid, and then (ii) the base material is dried for removal of a solvent from the coating liquid, so that the porous layer is formed.

The solvent for the coating liquid is preferably a solvent that does not adversely affect the base material, that allows the resin to be dissolved or dispersed therein uniformly and stably, and that allows the particles to be dispersed therein uniformly and stably. Examples of the solvent include N-methylpyrrolidone, N,N-dimethylacetamide, N,N-dimethylformamide, acetone, alcohols, water, and a mixed solvent containing two or more of these.

In a case where a preferable production method is employed in the method for producing the porous layer in accordance with an embodiment of the present invention, it is possible to control uniformity of internal structure and the like of the porous layer, and it is consequently possible to adjust the standard deviation of whiteness index of the nonaqueous electrolyte secondary battery porous layer in accordance with an embodiment of the present invention to the suitable range.

The preferable production method can be, for example, a method in which steam at a temperature of 53° C. to 57° C. is blown toward the coating liquid coating the base material at a blowing rate of 50 m$^3$/min to 80 m$^3$/min during an early stage of drying and removing the solvent in the coating liquid coating the base material, that is, for 10 seconds, preferably 8 seconds from when the drying and removing of the solvent started.

Embodiment 2: Nonaqueous Electrolyte Secondary Battery Laminated Separator

The nonaqueous electrolyte secondary battery laminated separator in accordance with an embodiment of the present invention has a configuration in which the porous layer is stacked on at least one surface of a polyolefin porous film.

In a case where porous layers are stacked on both surfaces of the nonaqueous electrolyte secondary battery laminated separator in accordance with an embodiment of the present invention, at least one of the porous layers needs to be the porous layer in accordance with an embodiment of the present invention, and both the porous layers are preferably the porous layer in accordance with an embodiment of the present invention.

<Polyolefin Porous Film>

The polyolefin porous film in accordance with an embodiment of the present invention (hereinafter also referred to simply as "porous film") includes polyolefin as a main component. The polyolefin porous film has therein many pores, connected to one another, so that a gas and a liquid can pass through the polyolefin porous film from one side to the other side. The porous film serves as a base material on which the porous layer is stacked in the nonaqueous electrolyte secondary battery laminated separator in accordance with an embodiment of the present invention.

The nonaqueous electrolyte secondary battery laminated separator in accordance with an embodiment of the present invention can include, in addition to the polyolefin porous film and the porous layer, other layer(s) such as an adhesive layer, a heat-resistant layer, and/or a protective layer.

The porous film contains a polyolefin at a proportion of not less than 50% by volume, preferably not less than 90% by volume, more preferably not less than 95% by volume, relative to the entire porous film. The polyolefin more preferably contains a high molecular weight component having a weight-average molecular weight of $5 \times 10^5$ to $15 \times 10^6$. In particular, the polyolefin more preferably contains a high molecular weight component having a weight-average molecular weight of not less than 1,000,000 because such a polyolefin allows the nonaqueous electrolyte secondary battery separator to have a higher strength.

Specific examples of the polyolefin (thermoplastic resin) include a homopolymer or a copolymer each produced by polymerizing a monomer such as ethylene, propylene, 1-butene, 4-methyl-1-pentene, or 1-hexene. Examples of the homopolymer include polyethylene, polypropylene, and polybutene. Examples of the copolymer include an ethylene/propylene copolymer.

Among the above examples, polyethylene is more preferable as it is capable of preventing a flow of an excessively large electric current at a lower temperature. The prevention of an excessively large electric current is also referred to as shutdown. Examples of the polyethylene include low-density polyethylene, high-density polyethylene, linear polyethylene (ethylene/α-olefin copolymer), and ultra-high molecular weight polyethylene having a weight-average molecular weight of not less than 1,000,000. Among these examples, ultra-high molecular weight polyethylene having a weight-average molecular weight of not less than 1,000,000 is further preferable.

The porous film has a film thickness of preferably 4 μm to 40 μm, more preferably 5 μm to 30 μm, still more preferably 6 μm to 15 μm.

The porous film can have a weight per unit area which weight is appropriately determined in view of the strength, film thickness, weight, and handleability. The weight per unit area is, however, within a range of preferably 4 g/m² to 15 g/m², more preferably 4 g/m² to 12 g/m², even more preferably 5 g/m² to 10 g/m², so as to allow a nonaqueous electrolyte secondary battery to have a higher weight energy density and a higher volume energy density.

The porous film has an air permeability of preferably 30 sec/100 mL to 500 sec/100 mL, more preferably 50 sec/100 mL to 300 sec/100 mL, in terms of Gurley values. A porous film having an air permeability within the above range can have sufficient ion permeability. A nonaqueous electrolyte secondary battery laminated separator in which the porous layer described above is provided on a porous film has an air permeability of preferably 30 sec/100 mL to 1000 sec/100 mL, more preferably 50 sec/100 mL to 800 sec/100 mL in terms of Gurley values. The nonaqueous electrolyte secondary battery laminated separator, which has the above air permeability, allows the nonaqueous electrolyte secondary battery to have sufficient ion permeability.

The porous film has a porosity of preferably 20% by volume to 80% by volume, more preferably 30% by volume to 75% by volume, so as to (i) retain a larger amount of electrolyte and (ii) obtain the function of reliably preventing a flow of an excessively large electric current at a lower temperature. Further, in order to obtain sufficient ion permeability and prevent particles from entering the positive electrode and/or the negative electrode, the porous film has pores each having a pore diameter of preferably not larger than 0.30 μm, more preferably not larger than 0.14 μm, even more preferably not larger than 0.10 μm.

[Method for Producing Polyolefin Porous Film]

The method for producing the polyolefin porous film is not limited to any particular one. For example, the method can include the following steps:

(A) Obtaining a polyolefin resin composition by kneading ultra-high molecular weight polyethylene, low molecular weight polyethylene having a weight-average molecular weight of not more than 10,000, a pore forming agent (such as calcium carbonate or plasticizer), and an antioxidant;

(B) Forming a sheet by rolling the obtained polyolefin resin composition with use of a pair of rollers, and gradually cooling the polyolefin resin composition while pulling the polyolefin resin composition with use of a winding roller rotating at a rate different from that of the pair of rollers;

(C) Removing the pore forming agent from the obtained sheet with use of an appropriate solvent; and (D) Stretching, at an appropriate stretch magnification, the sheet from which the pore forming agent has been removed.

<Method for Producing Nonaqueous Electrolyte Secondary Battery Laminated Separator>

A method for producing the nonaqueous electrolyte secondary battery laminated separator in accordance with an embodiment of the present invention can be, for example, the above-described method for producing the porous layer in which the above-described polyolefin porous film is used as a base material which is coated with the coating liquid.

Embodiment 3: Nonaqueous Electrolyte Secondary Battery

A nonaqueous electrolyte secondary battery in accordance with an embodiment of the present invention includes (i) a nonaqueous electrolyte secondary battery porous layer in accordance with an embodiment of the present invention or (ii) a nonaqueous electrolyte secondary battery laminated separator in accordance with an embodiment of the present invention.

The nonaqueous electrolyte secondary battery in accordance with an embodiment of the present invention can be, for example, a nonaqueous secondary battery that achieves an electromotive force through doping with and dedoping of lithium, and can be a lithium-ion secondary battery that includes a member for a nonaqueous electrolyte secondary battery (hereinafter referred to as a "nonaqueous electrolyte secondary battery member") including a positive electrode, a porous layer in accordance with an embodiment of the present invention, a polyolefin porous film, and a negative electrode, which are stacked in this order, that is, a lithium-ion secondary battery member that includes a positive electrode, a nonaqueous electrolyte secondary battery laminated separator in accordance with an embodiment of the present invention, and a negative electrode, which are stacked in this order. Note that constituent elements of the nonaqueous electrolyte secondary battery other than the porous layer are not limited to those described below.

The nonaqueous electrolyte secondary battery in accordance with an embodiment of the present invention is typically configured so that a battery element is enclosed in an exterior member, the battery element including (i) a structure in which the negative electrode and the positive electrode face each other through the nonaqueous electrolyte secondary battery porous layer in accordance with an embodiment of the present invention or the nonaqueous electrolyte secondary battery laminated separator in accordance with an embodiment of the present invention and (ii) an electrolyte with which the structure is impregnated. The nonaqueous electrolyte secondary battery in accordance with an embodiment of the present invention is preferably a secondary battery including a nonaqueous electrolyte, and is particularly preferably a lithium-ion secondary battery.

The nonaqueous electrolyte secondary battery in accordance with an embodiment of the present invention includes the nonaqueous electrolyte secondary battery porous layer in accordance with an embodiment of the present invention in which the standard deviation of whiteness index (WI) is 0.06 or more and 0.91 or less, and therefore brings about an effect of having an excellent long-term battery characteristic.

<Positive Electrode>

Examples of a positive electrode included in the nonaqueous electrolyte secondary battery in accordance with an embodiment of the present invention encompass a positive electrode sheet having a structure in which an active material layer including a positive electrode active material and a binding agent is formed on a current collector. The active material layer can further contain an electrically conductive agent.

The positive electrode active material is, for example, a material capable of being doped with and dedoped of lithium ions. Examples of such a material encompass a lithium complex oxide containing at least one transition metal such as V, Mn, Fe, Co, or Ni.

Examples of the electrically conductive agent encompass carbonaceous materials such as natural graphite, artificial graphite, cokes, carbon black, pyrolytic carbons, carbon fiber, and a fired product of an organic polymer compound. It is possible to use (i) only one kind of the above electrically conductive agents or (ii) two or more kinds of the above electrically conductive agents in combination, for example, a mixture of artificial graphite and carbon black.

Examples of the binding agent encompass: thermoplastic resins such as polyvinylidene fluoride, a copolymer of vinylidene fluoride, polytetrafluoroethylene, a vinylidene fluoride/hexafluoropropylene copolymer, a tetrafluoroethylene/hexafluoropropylene copolymer, a tetrafluoroethylene/perfluoroalkyl vinyl ether copolymer, an ethylene/tetrafluoroethylene copolymer, a vinylidene fluoride/tetrafluoroethylene copolymer, a vinylidene fluoride/trifluoroethylene copolymer, a vinylidene fluoride/trichloroethylene copolymer, a vinylidene fluoride/vinyl fluoride copolymer, a vinylidene fluoride/hexafluoropropylene/tetrafluoroethylene copolymer, a thermoplastic polyimide, polyethylene, and polypropylene; acrylic resin; and styrene butadiene rubber. Note that the binding agent also serves as a thickener.

The positive electrode mix can be prepared by, for example, a method of applying pressure to the positive electrode active material, the electrically conductive agent, and the binding agent on the positive electrode current collector or a method of using an appropriate organic solvent so that the positive electrode active material, the electrically conductive agent, and the binding agent are made into a paste form.

Examples of the positive electrode current collector encompass electric conductors such as Al, Ni, and stainless steel. Among these, Al is preferable because Al is easily processed into a thin film and is inexpensive.

The positive electrode sheet can be produced, that is, the positive electrode mix can be supported by the positive electrode current collector by, for example, a method in which pressure is applied to the positive electrode active material, the electrically conductive agent, and the binding agent on the positive electrode current collector to form a positive electrode mix thereon.

<Negative Electrode>

Examples of a negative electrode included in the nonaqueous electrolyte secondary battery in accordance with an embodiment of the present invention encompass a negative electrode sheet having a structure in which an active material layer including a negative electrode active material and a binding agent is formed on a current collector. The active material layer can further contain an electrically conductive agent.

Examples of the negative electrode active material encompass (i) a material capable of being doped with and dedoped of lithium ions, (ii) a lithium metal, and (iii) a lithium alloy. Specific examples of the material encompass: (1) carbonaceous materials such as natural graphite, artificial graphite, cokes, carbon black, pyrolytic carbons, carbon fiber, and a fired product of an organic polymer compound; (2) chalcogen compounds such as an oxide and a sulfide that are doped with and dedoped of lithium ions at an electric potential lower than that for the positive electrode; (3) metals such as aluminum (Al), lead (Pb), tin (Sn), bismuth (Bi), or silicon (Si), each of which is alloyed with alkali metal; (4) an intermetallic compound (AlSb, $Mg_2Si$, $NiSi_2$) of a cubic system in which intermetallic compound alkali metal can be inserted in voids in a lattice; and (5) lithium nitrogen compounds ($Li_{3-x}M_xN$ (where M represents a transition metal)).

The negative electrode mix can be prepared by, for example, a method in which pressure is applied to the negative electrode active material on a negative electrode current collector or a method in which an appropriate organic solvent is used so that the negative electrode active material is made into a paste form.

Examples of the negative electrode current collector encompass electric conductors such as Cu, Ni, and stainless steel.

The negative electrode sheet can be produced, that is, the negative electrode mix can be supported by the negative electrode current collector by, for example, a method in which pressure is applied to the negative electrode active material on the negative electrode current collector to form a negative electrode mix thereon. The above paste preferably includes the above electrically conductive agent and the above binding agent.

<Nonaqueous Electrolyte>

A nonaqueous electrolyte for use in the nonaqueous electrolyte secondary battery in accordance with an embodiment of the present invention is a nonaqueous electrolyte generally used in a nonaqueous electrolyte secondary battery, and is not limited to any particular one. Examples of the nonaqueous electrolyte encompass a nonaqueous electrolyte prepared by dissolving a lithium salt in an organic solvent. Examples of the lithium salt encompass $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic carboxylic acid lithium salt, and $LiAlCl_4$. It is possible to use only one kind of the above lithium salts or two or more kinds of the above lithium salts in combination.

Specific examples of the organic solvent in the nonaqueous electrolyte for the present invention include carbonates such as ethylene carbonate, propylene carbonate, dimethyl carbonate, diethyl carbonate, ethyl methyl carbonate, 4-trifluoromethyl-1,3-dioxolane-2-on, and 1,2-di(methoxy carbonyloxy)ethane; ethers such as 1,2-dimethoxyethane, 1,3-dimethoxypropane, pentafluoropropyl methylether, 2,2,3,3-tetrafluoropropyl difluoro methylether, tetrahydrofuran, and 2-methyl tetrahydrofuran; esters such as methyl formate, methyl acetate, and γ-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulfolane, dimethyl sulfoxide, and 1,3-propane sultone;

and fluorine-containing organic solvents each prepared by introducing a fluorine group into the organic solvents described above. It is possible to use only one kind of the above organic solvents or two or more kinds of the above organic solvents in combination.

<Method for Producing Nonaqueous Electrolyte Secondary Battery>

A nonaqueous electrolyte secondary battery in accordance with an embodiment of the present invention can be produced by, for example, (i) producing a nonaqueous electrolyte secondary battery member by providing the positive electrode, the nonaqueous electrolyte secondary battery porous layer in accordance with an embodiment of the present invention or the nonaqueous electrolyte secondary battery laminated separator in accordance with an embodiment of the present invention, and a negative electrode in this order, then (ii) inserting the nonaqueous electrolyte secondary battery member into a container that will serve as a housing of a nonaqueous electrolyte secondary battery, then (iii) filling the container with a nonaqueous electrolyte, and then (iv) hermetically sealing the container while reducing pressure inside the container.

The nonaqueous electrolyte secondary battery is not particularly limited in shape and can have any shape such as the shape of a thin plate (sheet), a disk, a cylinder, or a prism such as a cuboid. The nonaqueous electrolyte secondary battery member and the nonaqueous electrolyte secondary battery can each be produced by any method, and can each be produced by a conventionally publicly known method.

The present invention is not limited to the embodiments, but can be altered variously by a skilled person in the art within the scope of the claims. The present invention also encompasses, in its technical scope, any embodiment derived by appropriately combining technical means disclosed in differing embodiments. Further, it is possible to form a new technical feature by combining the technical means disclosed in the respective embodiments.

EXAMPLES

The following description will discuss the present invention in further detail with reference to Examples and Comparative Examples. Note, however, that the present invention is not limited to those Examples.

In each of Examples and Comparative Examples, physical properties and the like of a nonaqueous electrolyte secondary battery laminated separator, a layer A (polyolefin porous film), a layer B (porous layer), and a nonaqueous electrolyte secondary battery were measured by the following methods.

(1) Film Thickness (Unit: μm):

A thickness of the nonaqueous electrolyte secondary battery laminated separator (i.e., a total film thickness), a thickness of the layer A, and a thickness of the layer B were each measured with use of a high-precision digital length measuring machine available from Mitutoyo Corporation.

(2) Weight Per Unit Area (Unit: g/m$^2$):

A sample in the form of a 6.4 cm×4 cm rectangle was cut out from the nonaqueous electrolyte secondary battery laminated separator, and the weight W (g) of the sample was measured. Then, the weight per unit area of the nonaqueous electrolyte secondary battery laminated separator was calculated in accordance with the following formula:

Weight per unit area(g/m$^2$)=$W$/(0.064×0.04)

The weight per unit area of the layer A was calculated in a similar manner. The weight per unit area of the layer B was calculated by subtracting the weight per unit area of the layer A from the weight per unit area of the nonaqueous electrolyte secondary battery laminated separator.

(3) Average Particle Diameter (D50), Particle Size Distribution (Unit: μm):

The particle diameter of the filler was measured with use of MICROTRAC (MODEL: MT-3300EXII) available from NIKKISO CO., LTD.

(4) Measurement of Whiteness Index (WI):

Zero calibration and white calibration were carried out under the following conditions with use of a spectrophotometric colorimeter (CM-2500d, available from KONICA MINOLTA). As an underlay, black paper (available from Hokuetsu Kishu Paper Co., Ltd., colored high-quality paper, black, thickest type, shirokuhan (788 mm×1091 mm with the long side extending in a machine direction)) was placed on an experiment base, and a single sheet of the nonaqueous electrolyte secondary battery laminated separator was placed on the black paper such that a front surface of the layer B faces upward. Then, WI of the layer B was measured. Note that, for a nonaqueous electrolyte secondary battery laminated separator (3) below, WI of an aramid heat-resistant layer was measured.

(Conditions for Measuring WI)
Measurement area: inner diameter of 8 mm
Measurement: specular component included (SCI)
UV: 100% (UV component included)
Light source 1: D65 (daylight color, color temperature of 6504 k)
Observer: 10° (CIE1964)
Displayed data: WI ASTE E313 whiteness
Manual averaging: 3 (number of times)
Standard deviation: SCI 0.20
Auto averaging: 3 (number of times)
Measuring time: 0.0 s Example 1

[Production Example of Aramid Polymerization Liquid]

With use of a 3-liter separable flask having a stirring blade, a thermometer, a nitrogen incurrent canal, and a powder addition port, poly(paraphenylene terephthalamide) was produced.

The flask was sufficiently dried, 2200 g of N-methyl-2-pyrrolidone (NMP) was put in the flask, and 151.07 g of calcium chloride powder that had been vacuum-dried at 200° C. for 2 hours was added to the NMP and then completely dissolved in the NMP while a temperature of a mixture of the NMP and the calcium chloride powder was raised to 100° C. The temperature of a resultant solution was brought down to a room temperature, and 68.23 g of paraphenylenediamine was added to and completely dissolved in a resultant mixture. While a temperature of a resultant solution was maintained at 20° C.±2° C. and a dissolved oxygen concentration in polymerization was maintained at 0.5%, 124.97 g of dichloride terephthalate, which was separated into 10 pieces, was one-by-one added to the solution at approximately 5-minute intervals. After that, a resultant solution was ripened for 1 hour while being stirred and maintained at 20° C.±2° C. Then, the solution thus ripened was filtered through 1500-mesh stainless steel gauze. The solution thus obtained was a para-aramid solution having a para-aramid concentration of 6%.

<Layer A>

A porous film serving as a base material was prepared with use of polyethylene which is polyolefin.

That is, 70 parts by weight of an ultra-high molecular weight polyethylene powder (340M, available from Mitsui Chemicals, Inc.) and 30 parts by weight of a polyethylene wax (FNP-0115, available from Nippon Seiro Co., Ltd.) having a weight-average molecular weight of 1,000 were mixed with each other so that a mixed polyethylene was prepared. Then, with respect to 100 parts by weight of the mixed polyethylene thus obtained, 0.4 parts by weight of an antioxidant (Irg1010, available from Ciba Specialty Chemicals Inc.), 0.1 parts by weight of an antioxidant (P168, available from Ciba Specialty Chemicals Inc.), and 1.3 parts by weight of sodium stearate were added. Then, calcium carbonate (available from Maruo Calcium Co., Ltd.) having an average particle diameter of 0.1 µm was further added so that the calcium carbonate accounted for 38% by volume of the total volume. Then, the above composition in powder form was mixed with use of a Henschel mixer, and was then melted and kneaded by a twin screw kneading extruder. This produced a polyethylene resin composition.

Next, the polyethylene resin composition was rolled with use of a pair of rollers each having a surface temperature of 150° C., so that a sheet was prepared. This sheet was immersed in an aqueous hydrochloric acid solution (containing 4 mol/L of hydrochloric acid and 0.5% by weight of nonionic surfactant) to dissolve the calcium carbonate for removal of the calcium carbonate from the sheet. Subsequently, the sheet was stretched at a stretching temperature of 105° C. and a stretching magnification of 6 times, and thus a porous film (layer A) made of polyethylene was prepared.

<Layer B>

The para-aramid solution obtained in the above production example of aramid polymerization liquid was weighed by 100 g and put in a flask. Then, 300 g of NMP was added to the solution. Thus, a para-aramid solution having a para-aramid concentration of 1.5% by weight was prepared, and the solution thus prepared was stirred for 60 minutes. Subsequently, 6 g of alumina C (available from NIPPON AEROSIL CO., LTD.) was mixed with the solution, and a resultant solution was stirred for 240 minutes. A resultant solution was filtered with a 1000-mesh metal gauze, and then 0.73 g of calcium carbonate was added and stirred for 240 minutes for neutralization. A resultant mixture was then defoamed under reduced pressure, and thus a coating liquid (1) in the form of slurry was prepared.

The polyethylene porous film (layer A) having a film thickness of 10 µm was coated with the coating liquid (1) with use of a coating bar. The coating liquid (1) was dried to deposit a para-aramid resin contained in the coating liquid (1), and thus a coating film was formed on the layer A. For several seconds in the early stage of the drying, steam at a temperature of 55° C. was blown at a blowing rate of 50 m³/min onto the surface of the layer A coated with the coating liquid (1). Next, the coating film was cleaned with water and dried to form a heat-resistant porous layer on the layer A, and thus a laminated separator was obtained. The laminated separator thus obtained is herein referred to as a nonaqueous electrolyte secondary battery laminated separator (1).

Example 2

A laminated separator was obtained in a manner similar to that of Example 1, except that a clearance in coating the layer A with the coating liquid (1) with use of the coating bar was changed and a weight per unit area of an obtained heat-resistant porous layer (layer B) was changed to a value indicated in Table 1. The laminated separator thus obtained is herein referred to as a nonaqueous electrolyte secondary battery laminated separator (2). Note that the clearance means a size of a gap between the layer A and the coating bar.

Example 3

(1) Preparation of Coating Liquid (2) (CMC Coating Liquid)

CMC (available from Dai-Ichi Kogyo Seiyaku Co., Ltd., Serogen 4H) in an amount of 100 g was prepared and added to 4.9 kg of water while stirring to mix for one hour, and thus the CMC was dissolved to obtain an aqueous CMC solution. After that, 5 kg of water and 2.5 kg of ethanol were added to the aqueous CMC solution and stirred for 30 minutes. To a resultant mixture, 500 g of particles (a) (fine powdery alumina (available from Sumitomo Chemical Company, Limited, AKP-G008, average particle diameter: 0.1 µm or less, specific surface area: 70 m²/g on average)) and 500 g of particles (b) (alumina powder (available from Sumitomo Chemical Company, Limited, Sumicorandom AA03, D50: 0.46 µm, specific surface area: 5 m²/g)) were added. A resultant mixture was stirred for 30 minutes under a condition of 3000 rpm with use of a homogenizer. After that, with use of a Gaulin homogenizer, the particles (a) and (b) were dispersed in the aqueous CMC solution under pressure of 60 MPa. The dispersion with use of the Gaulin homogenizer was additionally repeated two times, and thus a CMC coating liquid was obtained. The CMC coating liquid thus obtained is herein referred to as a coating liquid (2).

(2) Preparation of Coating Liquid 3 (Aramid Coating Liquid)

To 5000 g of an NMP/calcium chloride solution (calcium chloride concentration=7.1% by weight), 150.00 g of para-phenylenediamine (hereinafter, referred to as "PPD") was added and stirred in a nitrogen atmosphere to dissolve the PPD, and thus a PPD solution was obtained. Then, to the PPD solution thus obtained, 273.94 g of dichloride terephthalate (hereinafter, referred to as "TPC") was added and stirred at 15° C. to cause reaction for one hour, and thus a polyparaphenylene terephthalamide solution was obtained.

The solution was taken in an amount of 1000 g and, to the solution, 3000 g of NMP, 23.4 g of calcium carbonate (available from Ube Material Industries, Ltd.), 60 g of particles (a) (fine powdery alumina (available from NIPPON AEROSIL CO., LTD., alumina C (ALC), average particle size: 0.013 µm)), and 60 g of particles (b) (alumina powder (available from Sumitomo Chemical Company, Limited, Sumicorandom AA03, D50: 0.46 µm, specific surface area: 5 m²/g)) were added. After mixing by stirring, a dispersing process was carried out once under pressure of 50 MPa with use of a Gaulin homogenizer (available from APV), and thus an aramid coating liquid having a solid content concentration of 4.35% by weight was obtained. In the solid content, a weight ratio of aramid:particles (a):particles (b) was 1:1:1. The aramid coating liquid thus obtained is herein referred to as a coating liquid (3).

(3) Production of Separator (3-1) Coating of CMC Layer

As a layer A, the porous film (layer A) described in Example 1 was used. A surface of the porous film (layer A) was coated with the coating liquid (2), which is a CMC coating liquid, with use of a coating bar. After the coating, the coating liquid (2) was dried to deposit a CMC layer, and thus a CMC laminated body in which the CMC layer was stacked on one surface of the layer A was obtained.

(3-2) Stacking of Layer B

One surface of the CMC laminated body, which surface was opposite to the CMC layer, was coated with the coating liquid (3), which was an aramid coating liquid, with use of a coating bar. After the coating, the coating liquid (3) was dried to deposit an aramid resin contained in the coating liquid (3), and thus a laminated separator was obtained in which one surface had an aramid heat-resistant layer (layer B) and the other one surface had the CMC layer. For several seconds in the early stage of the drying, steam at a temperature of 55° C. was blown at a blowing rate of 50 m$^3$/min onto the surface of the layer A coated with the coating liquid (3). The laminated separator thus obtained is herein referred to as a nonaqueous electrolyte secondary battery laminated separator (3).

Example 4

A nonaqueous electrolyte secondary battery laminated separator (4) was produced with use of a layer A and a layer B below.
<Layer A>
As a layer A, a porous film (layer A) which was obtained by the method described in Example 1 and had a thickness of 12 μm was used.
<Layer B>
Under a room temperature, 154.15 g of resorcin and 340.89 g of a 37% aqueous formaldehyde solution were put into a 2-L separable flask in which air had been replaced with nitrogen so that a molar ratio of resorcin and formaldehyde became 1:3. Further, 1541.5 g of water and 0.0786 g of sodium carbonate were added. A dispersion state was made uniform by stirring and then a temperature was raised to 80° C. The mixture was kept at 80° C. for 24 hours to carry out polymerization reaction, and thus a suspension containing particles of a resorcin-formalin resin (RF resin) was obtained.

After radiational cooling, the suspension thus obtained was centrifuged, so that the particles of the RF resin precipitated. Then, a supernatant dispersion medium was removed while the precipitated particles of the RF resin were left. Then, the RF resin was cleaned by carrying out twice a cleaning operation including (i) adding water which served as a cleaning liquid, (ii) stirring a resulting mixture, and (iii) centrifuging the mixture so as to remove the cleaning liquid. Particles of the cleaned RF resin were dried, and an organic filler (1) was quantitatively synthesized. As a resin contained in the porous layer, sodium carboxymethylcellulose (CMC) (available from DAICEL CORPORATION; CMC1110) was used.

As a solvent, a mixed solvent containing water and isopropyl alcohol (water:isopropyl alcohol=95% by weight: 5% by weight) was used.

The organic filler (1), CMC, and the solvent were mixed so that a solid concentration (i.e., a concentration of the organic filler (1) and CMC) in an obtained mixed solution became 20.0% by weight and a weight ratio of the organic filler (1):CMC became 100:8, and thus a dispersion liquid containing the organic filler (1) was obtained. The dispersion liquid thus obtained was dispersed by high pressure (high-pressure dispersion conditions: 100 MPa×3 passes) with use of a high-pressure dispersing device (available from Sugino Machine Limited; Star Burst), so that a coating liquid was prepared. The coating liquid thus prepared is herein referred to as a coating liquid (4).
<Nonaqueous Electrolyte Secondary Battery Laminated Separator>

One surface of the layer A was uniformly coated with the coating liquid (4) with use of a gravure coater. The coating liquid (4) was dried to deposit CMC contained in the coating liquid (4) so as to form a CMC layer. For several seconds in the early stage of the drying, steam at a temperature of 55° C. was blown at a blowing rate of 50 m$^3$/min onto the surface of the layer A coated with the coating liquid (4). Thus, a laminated separator was obtained in which the CMC layer (layer B) was stacked on a surface of the layer A. The laminated separator thus obtained is herein referred to as a nonaqueous electrolyte secondary battery laminated separator (4).

Example 5

A nonaqueous electrolyte secondary battery laminated separator (5) was produced with use of a layer A and a layer B below.
<Layer A>
The same porous film (layer A) as Example 4 was used.
<Layer B>
Under a room temperature, 154.15 g of resorcin and 170.45 g of a 37% aqueous formaldehyde solution were put into a 2-L separable flask in which air had been replaced with nitrogen so that a molar ratio of resorcin and formaldehyde became 1:1.5. Further, 1541.5 g of water and 0.0786 g of sodium carbonate were added. A dispersion state was made uniform by stirring and then a temperature was raised to 80° C. The mixture was kept at 80° C. for 24 hours to carry out polymerization reaction, and thus a suspension containing particles of a resorcin-formalin resin (RF resin) was obtained.

After radiational cooling, the suspension thus obtained was centrifuged, so that the particles of the RF resin precipitated. Then, a supernatant dispersion medium was removed while the precipitated particles of the RF resin were left. Then, the RF resin was cleaned by carrying out twice a cleaning operation including (i) adding water which served as a cleaning liquid, (ii) stirring a resulting mixture, and (iii) centrifuging the mixture so as to remove the cleaning liquid. Particles of the cleaned RF resin were dried, and an organic filler (2) was quantitatively synthesized. After that, a coating liquid was prepared in a manner similar to that of Example 4, except that the organic filler (2) was used instead of the organic filler (1). The coating liquid thus prepared is herein referred to as a coating liquid (5).
<Nonaqueous Electrolyte Secondary Battery Laminated Separator>
A laminated separator was obtained by an operation similar to that of Example 4, except that the coating liquid (5) was used instead of the coating liquid (4). The laminated separator thus obtained is herein referred to as a nonaqueous electrolyte secondary battery laminated separator (5).

Comparative Example 1

A nonaqueous electrolyte secondary battery laminated separator was prepared with use of a layer A and a layer B below.
<Layer A>
A polyethylene porous film (layer A) was prepared in a manner similar to that of Example 1.
<Layer B>
A coating liquid was prepared by carrying out an operation similar to that of Example 4, except that, as a filler, α alumina powder (available from Sumitomo Chemical Company, Limited, product name: Sumicorandom AA05) was used instead of the organic filler (1). The coating liquid thus prepared is herein referred to as a coating liquid (6).

<Nonaqueous Electrolyte Secondary Battery Laminated Separator>

One surface of the layer A was subjected to a corona treatment at 20 W/(m²/min). Next, the surface of the layer A which has been subjected to the corona treatment was uniformly coated with the coating liquid (6) with use of a gravure coater, and thus a coating film was formed on the layer A. Then, the coating film thus formed was dried to deposit a porous layer (layer B) on the layer A. Thus, a laminated separator was obtained in which the layer B was stacked on one surface of the layer A. The laminated separator thus obtained is herein referred to as a nonaqueous electrolyte secondary battery laminated separator (6).

Comparative Example 2

A nonaqueous electrolyte secondary battery laminated separator was prepared with use of a layer A and a layer B below.

<Layer A>

A polyethylene porous film (layer A) was prepared in a manner similar to that of Example 1.

<Layer B and Nonaqueous Electrolyte Secondary Battery Laminated Separator>

A porous layer (layer B) was deposited on the layer A to obtain a laminated separator by carrying out an operation similar to that of Example 1, except that the coating liquid (3) prepared in Example 3 was used instead of the coating liquid (1) and drying was carried out without blowing steam in the early stage of the drying. The laminated separator thus obtained is herein referred to as a nonaqueous electrolyte secondary battery laminated separator (7).

<Physical Property Evaluation of Nonaqueous Electrolyte Secondary Battery Separator>

Physical properties and the like of the nonaqueous electrolyte secondary battery laminated separators (1) through (7) obtained in Examples 1 through 5 and Comparative Examples 1 and 2 were measured with the above described methods. The results are shown in Table 1. The film thickness (μm) of the laminated body obtained in Example 3 is a total film thickness of the CMC layer, the layer A, and the aramid coating layer.

<Measurement of WI and WI Standard Deviation on Surface of Layer B>

A plurality of different portions, which were arbitrarily selected, on the layer B of the nonaqueous electrolyte secondary battery laminated separator were irradiated with light, and WI was measured two or more times. The measurement was carried out three times. Based on the measured values of WI, a standard deviation of WI was calculated.

<Preparation of Electrodes>

(Preparation of Positive Electrode)

A mixture obtained by mixing 6 parts by weight of acetylene black and 4 parts by weight of polyvinylidene fluoride (available from KUREHA CORPORATION) with 90 parts by weight of $LiNi_{1/3}Mn_{1/3}Co_{1/3}O_2$ serving as a positive electrode active material was dispersed in N-methyl-2-pyrolidone, and thus a slurry was prepared. The slurry thus obtained was applied uniformly to a part of an aluminum foil serving as a positive electrode current collector and dried, and then rolled to have a thickness of 80 μm with a pressing machine.

Next, the aluminum foil thus rolled was cut so as to obtain a positive electrode that had (i) a first portion on which a positive electrode active material layer was formed and which had a size of 40 mm×35 mm and (ii) a second portion on which no positive electrode active material layer was formed, which had a width of 13 mm, and which remained on an outer periphery of the first portion. The positive electrode active material layer had a density of 2.50 g/cm³.

(Preparation of Negative Electrode)

Graphite powder (serving as a negative electrode active material) in an amount of 98 parts by weight was mixed with 100 parts by weight of an aqueous solution containing a thickener and carboxymethyl cellulose serving as a binding agent (carboxymethyl cellulose concentration: 1% by weight) and with 1 part by weight of a water-based emulsion of styrene-butadiene rubber, and thus a slurry was prepared. The slurry thus obtained was applied to a part of a rolled copper foil, which served as a negative electrode current collector and had a thickness of 20 μm, and dried, and then rolled to have a thickness of 80 μm with a pressing machine.

Next, the rolled copper foil thus rolled was cut so as to obtain a negative electrode that had (i) a first portion on which a negative electrode active material layer was formed and which had a size of 50 mm×40 mm and (ii) a second portion on which no negative electrode active material layer was formed, which had a width of 13 mm, and which remained on an outer periphery of the first portion. The negative electrode active material layer had a density of 1.40 g/cm³.

<Preparation of Nonaqueous Electrolyte Secondary Battery>

In a laminate pouch, the positive electrode, the nonaqueous electrolyte secondary battery laminated separator, and the negative electrode were stacked (arranged) in this order so that (i) the layer B of the nonaqueous electrolyte secondary battery laminated separator and the positive electrode active material layer of the positive electrode come into contact with each other and (ii) the layer A of the nonaqueous electrolyte secondary battery laminated separator and the negative electrode active material layer of the negative electrode come into contact with each other. This produced a nonaqueous electrolyte secondary battery member. In so doing, the positive electrode and the negative electrode were arranged so that a main surface of the positive electrode active material layer of the positive electrode was entirely included in a range of a main surface of the negative electrode active material layer of the negative electrode (i.e., entirely covered by the main surface of the negative electrode active material layer of the negative electrode). Here, as the nonaqueous electrolyte secondary battery laminated separator, each of the nonaqueous electrolyte secondary battery laminated separators (1) through (7) prepared in Examples 1 through 5 and Comparative Examples 1 and 2 was used.

Subsequently, the nonaqueous electrolyte secondary battery member was put into a bag made of a laminate of an aluminum layer and a heat seal layer. Further, 0.23 mL of nonaqueous electrolyte was put into the bag. The nonaqueous electrolyte was prepared by dissolving $LiPF_6$ in a mixed solvent of ethylene carbonate, ethyl methyl carbonate, and diethyl carbonate at a ratio of 3:5:2 (volume ratio) so that the $LiPF_6$ would be contained at 1 mol/L. The bag was then heat-sealed while pressure inside the bag was reduced, so that a nonaqueous electrolyte secondary battery was prepared. Nonaqueous electrolyte secondary batteries prepared with use of the respective nonaqueous electrolyte secondary battery laminated separators (1) through (7) are herein referred to as nonaqueous electrolyte secondary batteries (1) through (7).

<Increase Ratio (%) of Resistance at 1 kHz Through 100 Cycles>

Each of the nonaqueous electrolyte secondary batteries (1) through (7) which has not been subjected to a charge-discharge cycle was subjected to four cycles of initial charge and discharge at 25° C. Each of the four cycles of initial charge and discharge was carried out (i) at a voltage ranging from 2.7 V to 4.1 V, (ii) with CC-CV charge at a charge current value of 0.2 C (where the terminal current condition was 0.02 C), and (iii) with CC discharge at a discharge current value of 0.2 C (where the value of an electric current at which a battery rated capacity defined as a one-hour rate discharge capacity was discharged in one hour was assumed to be 1 C; the same applies hereinafter). Note here that the "CC-CV charge" is a charging method in which (i) a battery is charged at a predetermined constant electric current and, (ii) after a certain voltage is reached, the certain voltage is maintained while the electric current is being reduced. The "CC discharge" is a discharging method in which a battery is discharged at a predetermined constant electric current until a certain voltage is reached. A resistance at 1 kHz after the initial charge and discharge was measured.

Further, a resistance at 1 kHz after a cycle test (including 100 cycles of charge at 1 C and discharge at 10 C at 55° C.) was measured. From the resistances thus obtained, an increase ratio of resistance at 1 kHz through 100 cycles (55° C.) was calculated based on the following formula. Increase ratio (%) of resistance at 1 kHz through 100 cycles=resistance at 1 kHz after 100 cycles×100/resistance at 1 kHz of nonaqueous electrolyte secondary battery after initial charge and discharge

[Conclusion]

TABLE 1

| | Polyolefin porous film (Layer A) | Porous layer (Layer B) | | Nonaqueous electrolyte secondary battery laminated separator |
| --- | --- | --- | --- | --- |
| | Film thickness [μm] | Film thickness [μm] | Weight per unit area [g/m²] | Film thickness [μm] |
| Example 1 | 10.3 | 2.2 | 1.4 | 12.5 |
| Example 2 | 10.3 | 2.7 | 1.7 | 13.0 |
| Example 3 | 10.3 | 3.6 | 3.2 | 23.7 |
| Example 4 | 12.0 | 2.4 | 2.4 | 14.4 |
| Example 5 | 12.0 | 6.1 | 4.6 | 18.1 |
| Com. Ex. 1 | 12.9 | 4.7 | 7.0 | 17.6 |
| Com. Ex. 2 | 10.5 | 6.3 | 4.7 | 16.8 |

TABLE 2

| | Porous layer (Layer B) WI standard deviation | Nonaqueous electrolyte secondary battery Increase ratio of resistance at 1 kHz through 100 cycles [%] |
| --- | --- | --- |
| Example 1 | 0.381 | 208.7 |
| Example 2 | 0.288 | 251.1 |
| Example 3 | 0.520 | 266.1 |
| Example 4 | 0.163 | 283.3 |
| Example 5 | 0.352 | 182.0 |
| Com. Ex. 1 | 0.059 | 329.8 |
| Com. Ex. 2 | 0.915 | 288.9 |

As shown in Table 2, the nonaqueous electrolyte secondary batteries including the nonaqueous electrolyte secondary battery laminated separators (1) through (5) which were prepared in Examples 1 through 5 and included porous layers having the WI standard deviation ranging from 0.06 to 0.91 had the increase ratios (%) of resistance at 1 kHz through 100 cycles which are lower than those of the nonaqueous electrolyte secondary batteries including the nonaqueous electrolyte secondary battery laminated separators (6) and (7) which were prepared in Comparative Examples 1 and 2 and had the WI standard deviations falling out of the above range.

As such, it has been found that the nonaqueous electrolyte secondary battery porous layer in accordance with an embodiment of the present invention can improve the long-term battery characteristic of the nonaqueous electrolyte secondary battery.

INDUSTRIAL APPLICABILITY

A nonaqueous electrolyte secondary battery porous layer in accordance with an embodiment of the present invention is usable for production of a nonaqueous electrolyte secondary battery having an excellent long-term battery characteristic.

The invention claimed is:

1. A nonaqueous electrolyte secondary battery porous layer, wherein a standard deviation of whiteness index is 0.15 or more and 0.91 or less, the whiteness index being defined in E313 of the American Standards Test Methods, the standard deviation of whiteness index being calculated based on measured values of the whiteness index for a plurality of arbitrarily selected portions on a surface of the nonaqueous electrolyte secondary battery porous layer, the measured values of the whiteness index being obtained by irradiating the plurality of arbitrarily selected portions with light.

2. The nonaqueous electrolyte secondary battery porous layer as set forth in claim 1, comprising one or more resins selected from the group consisting of polyolefin, a (meth)acrylate resin, a fluorine-containing resin, a polyamide resin, a polyester resin, and a water-soluble polymer.

3. The nonaqueous electrolyte secondary battery porous layer as set forth in claim 1, comprising a polyamide resin.

4. The nonaqueous electrolyte secondary battery porous layer as set forth in claim 3, wherein the polyamide resin is an aramid resin.

5. The nonaqueous electrolyte secondary battery porous layer as set forth in claim 4, wherein the aramid resin is one or more aramid resins selected from the group consisting of poly(paraphenylene terephthalamide), poly(metaphenylene terephthalamide), and a paraphenylene terephthalamide/metaphenylene terephthalamide copolymer.

6. The nonaqueous electrolyte secondary battery porous layer as set forth in claim 1, comprising a heat-resistant filler.

7. The nonaqueous electrolyte secondary battery porous layer as set forth in claim 6, wherein the heat-resistant filler contains an inorganic filler.

8. The nonaqueous electrolyte secondary battery porous layer as set forth in claim 7, wherein the inorganic filler contains one or more inorganic substances selected from the group consisting of alumina, boehmite, aluminum hydroxide, magnesium hydroxide, magnesium oxide, titanium oxide, and silica.

9. A nonaqueous electrolyte secondary battery laminated separator, wherein the nonaqueous electrolyte secondary battery porous layer according to claim 1 is stacked on one surface or both surfaces of a polyolefin porous film.

10. A nonaqueous electrolyte secondary battery comprising:

the nonaqueous electrolyte secondary battery porous layer according to claim 1.

11. A nonaqueous electrolyte secondary battery comprising:
the nonaqueous electrolyte secondary battery laminated separator according to claim 9.

\* \* \* \* \*